United States Patent
Bohnlein et al.

[11] 3,729,047
[45] Apr. 24, 1973

[54] DIE-CASTING MACHINE

[75] Inventors: Friedrich Bohnlein; Georg Stollmann, both of Brescia, Italy

[73] Assignee: Idra-Pressen GmbH, Stuttgart, Germany

[22] Filed: Jan. 28, 1972

[21] Appl. No.: 221,568

[52] U.S. Cl. .................164/150, 324/175, 164/4, 350/96 B, 250/227
[51] Int. Cl.......B22c 19/04, B22c 25/00, B22d 1/02, B22d 17/32
[58] Field of Search .................164/4, 150; 324/175; 350/96 B; 250/227

[56] References Cited

UNITED STATES PATENTS 3,575,129   4/1971   Sullivan.............................324/175
3,514,617   5/1970   Klyce................................250/227

OTHER PUBLICATIONS

IBM Technical Disclosure Bulletin, Dec. 1961, Vol. 4, No. 7, Hamrick et al.

*Primary Examiner*—J. Spencer Overholser
*Assistant Examiner*—V. K. Rising
*Attorney*—Kenwood Ross

[57] ABSTRACT

In a die casting machine having a piston rod attached to a pressure or firing piston thereof, a device for measuring the speed of said piston comprises: a reflector on said piston rod; a first member arranged generally parallel to said piston rod and carrying a plurality of regularly spaced light transmitters; and a second member also arranged generally parallel to the piston rod and carrying a plurality of regularly spaced light receivers, said members being arranged so that as the piston rod moves during a casting operation light from each transmitter is reflected into a corresponding receiver as the reflector carried by the piston passes therealong, the transmitters passing a series of pulses to a recorder from which the speed of the piston rod, and thus the piston, can be determined.

10 Claims, 8 Drawing Figures

Patented April 24, 1973
3,729,047
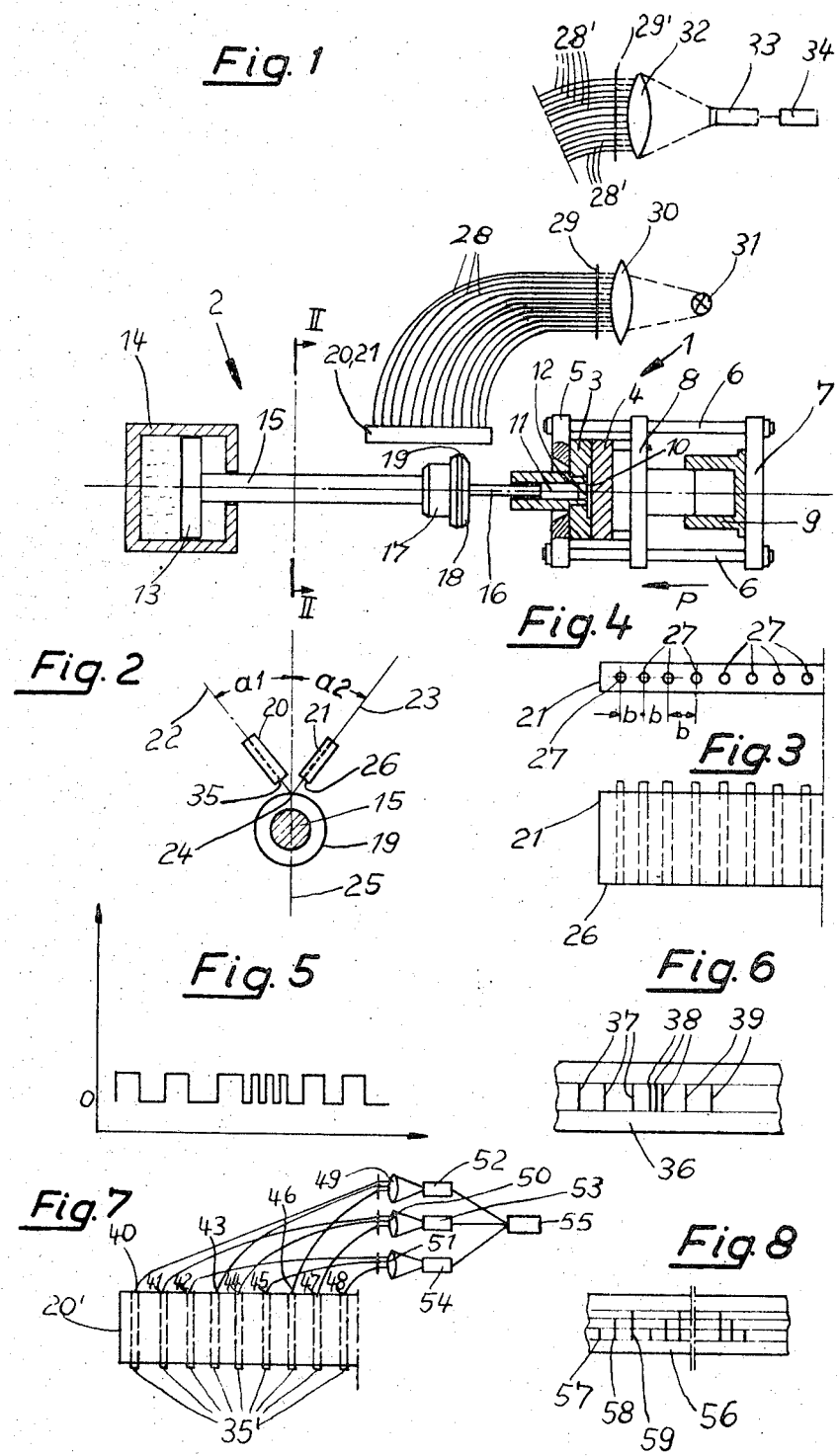

DIE-CASTING MACHINE

This invention relates to a cold-chamber die-casting machine and particularly to a device for measuring the speed of the shot or firing piston thereof.

Photoelectrically operative devices for measuring firing piston speed on cold-chamber die-casting machines are known. In one known device of this type, there is fastened to the usual screw cap which connects the usual press piston rod to the usual firing piston rod, a photoelectrical system consisting of a light emitter and a light receiver, and, parallel to the piston rods, a straight edge, having regularly spaced screen or raster slots, is arranged between the light emitter and the light receiver. Upon piston movement, the photoelectrical system is carried with the piston rods and a beam of light from the light emitter slides along the straightedge and, wherever a screen slot is present, passes through the slot and strikes the light receiver which may be a photodiode. This latter, when a pulse of light from a slot impinges thereon, passes an electrical impulse to a subsequently recording apparatus, in which recording paper runs at a uniform speed which can be adjusted. The recording apparatus marks the impulses on the recording paper. The number of the impulses per unit of time gives an accurate indication of the speed of movement of the photoelectrical system and of the piston rods and therefore of the firing piston during its motion.

Those parts of the measuring device which are connected to the screw cap and which are of high weight and thus have high inertion are, because of the rapid firing piston speed and the sudden stopping thereof upon complete filling of the mould, exposed to high mechanical stresses. Because of this failure during operation frequently occurs which is a severe disadvantage. A further disadvantage lies in the fact that the firing piston can rotate and if this happens the light emitter and receiver may possibly be moved of the path of the screen straightedge.

An object of the present invention is to obviate or minimize the above disadvantages.

Accordingly the invention provides a cold chamber die-casting machine having a firing piston, a piston rod connected thereto and a device for measuring the speed of movement of said piston, said device comprising: a reflector mounted on said piston rod; a first member disposed generally parallel to said piston rod and carrying a plurality of regularly spaced light transmitters; a second member disposed generally parallel to said piston rod and carrying a plurality of regularly spaced light receivers, said members being so arranged that light from any one of said transmitters is reflected by said reflector to a corresponding one of said light receivers when said reflector is adjacent said one transmitter.

In the device of the invention no additional members whatsoever are fastened to the piston rods if the usual screw cap constitutes the reflecting ring. Rotation of the firing piston and of the piston rods in no way influences the measurement because, in each angular position of the firing piston, a reflecting surface is disposed opposite the incident light. Preferably the light emitters are each constituted by one end of a light conducting filament, the other end of which is directed towards a common light source, a common lens directing light from the source into the filaments.

Also the light receivers are conveniently constituted by respective one ends of light conducting filaments the other ends of which are directed towards a photodiode arrangement. This photodiode arrangement comprises, in the simplest case, a single photodiode connected to a subsequent impulse recorder. Such an apparatus allows the firing piston speed to be determined quickly and accurately at any desired point in its movement.

In many cases it is desirable also to be able to establish from the recordings of the impulse recorder whether the firing piston, at the interesting instant when maximum pressure is applied to metal in a mould of the machine, has moved towards the mould or back from this latter in a recoil. The device of the invention meets this requirement if, as a further feature of the invention, the photodiode arrangement comprises a set of photodiodes and the light receiving filaments are arranged in groups, for example three groups, each of which groups has its said other ends led to a respective photodiode. In this case all the photodiodes are connected to a common impulse recorder which has, for each group, an individual marking sign, which enable signals from any one group to be distinguished from those of other groups. From the sequence of the different marking signs, the direction of movement of the firing piston can immediately be ascertained from the record of the impulse recorder.

It is particularly advantageous that the light conductors are in the form of filaments of glass.

The invention will be described further, by way of example with reference to the accompanying drawings, wherein:

FIG. 1 is a schematic diagram illustrating a cold-chamber die-casting machine, partly in cross-section and provided with a firing piston speed measuring device conforming to the present invention;

FIG. 2 is a section along the line II—II in FIG. 1;

FIG. 3 is an enlarged partial front elevation of one strip of the device of FIG. 1;

FIG. 4 is a partial inverted plan view of the strip of FIG. 2;

FIG. 5 is a diagram illustrating light pulses generated by the device;

FIG. 6 illustrates markings made on recording paper as a result of impulses shown in FIG. 5 by means of an impulse recorder;

FIG. 7 shows a light receiver strip of the device in conjunction with an impulse recorder for determining the speed and also the direction of movement of the firing piston;

FIG. 8 shows a part of a recording paper having markings made by the impulse recorder of FIG. 7 after a certain type of movement of the piston.

A cold-chamber die-casting machine conforming to the invention comprises a mould carrier part 1 having a stationary mould half 3 and a movable mould half 4. The mould half 3 is fastened to a machine plate 5, which is connected, via columns 6, to a counter plate 7. Mounted on the columns 6 so as to be reciprocable in the direction of the arrow P is a shield 8. Clamped to the shield 8 is the mould half 4. A hydraulic closing mechanism 9 serves for shifting the shield 8 and consequently the mould half 4. Between the mould halves 3 and 4 is a mould cavity 10 which is filled with liquid metal 12 by means of the firing piston 11 in each casting operation.

For pressing of metal 12 into the mould cavity 10 there is provided a hydraulically actuatable injection part 2 a piston 13 of which is axially movable in both directions, in a cylinder 14. A piston rod 15, connected securely to the piston 13, is fastened to the firing piston rod 16 by means of a screw cap or union 17.

The screw cap 17 has a flange 18 which is greater in diameter than the cap 17 and which has a narrow facetted ring 19 which is kept highly-polished. Opposite the facetted ring 19, along the possible path of displacement of the facetted ring 19, two straightedged strips 20, 21 are arranged and inclined one towards the other in such a way that their axes of inclination 22, 23 meet on the upper surface of the facetted ring 19 at 24, the angles $a1$ and $a2$, which the center lines 22, 23 form with the line of symmetry 25 leading through the longitudinal middle line of the piston rod 15 being equal.

Arranged on the lower edge 26 of the strip 21 at a uniform longitudinal spacing $b$ are light emitters 27. These are in the form of end portions of light conducting glass filaments 28 which are received and secured in apertures in the strips. Ends of the filaments 28 lie flush with the lower edge of the strip and their other end lead to a mounting support 29 which is arranged opposite a common convex lens 30, which directs beams from a light source 31, which can be in the form of an electric incandescent lamp.

The strip 20 is substantially identical to strip 21, but the ends of filaments 28 mounted in this strip 20 are effective as light receivers. The filaments 28' lead from the strip 20 to a mounting support 29', which is provided opposite a lens 32, which focusses light from the filaments 28' on a photodiode 33. This latter is connected to an impulse recorder 34.

Light from the light source 31 arrives, via the filaments and the light emitters 27, at the lower edge 26 of the strip 21. When the facetted ring 19 is opposite a light emitter 27, emitted light strikes the facetted ring at 24. This light is reflected towards the lower edge of the strip 20 and strikes that glass filament aligned with the emitter beam, at the one end thereof. This latter acts as a light receiver 35. From here the light travels via the pertinent filament 28' at the lens 32 and from there to the photodiode 33 which transmits an electrical impulse to the recorder 34. Depending upon the speed of the piston 11, there is thus fed to the recorder 34 an impulse sequence, characteristic of this speed. A diagram is shown FIG. 5 which illustrates pulses coming from the photodiode. The light impulses are as has been said converted by the photodiode 33, into electrical impulses, which the impulse recorder 34 records on the recording paper 36 in the form of markings 37 or 38 or 39. Since the recording paper 36 is conveyed at an adjustable uniform speed, the number of impulses 37 or 38 or 39 represents an indication of the speed of movement of the piston 11. This speed can be determined at any instant whatsoever and at any position along the path of the firing piston 11 by inspection of the recordings.

In the light receiving strip 20' shown in FIG. 7, the filaments 40, 41, 42, 43, 44, 45, 46, 47, 48 belonging to the light receivers 35' are arranged in three groups each group of filaments leading to a respective one of three convex lenses 49, 50, 51. Thus the filament 40 is associated with the lens 49, the filament 41 with the lens 50 and the filament 42 with the lens 51, this sequence being repeated for all the filaments along the strip 20'. Associated with each lens 49, 50, 51 is a photodiode 52, 53, 54. Each photodiode is connected to its own impulse recorder within a common recording apparatus 55. The impulse recorders mark, with different line length, the impulses received. By way of example, impulses originating from the photodiode 52 are recorded on the recording paper 56 by small transverse lines 57 whereas the impulses of the photodiode 53 are illustrated by somewhat longer lines 58 and the impulses of the photodiode 54 are illustrated by still longer lines 59.

The speed of the piston at any instant whatsoever can be calculated from the density of the impulse sequence. In addition, however, also from the sequence of the different markings it can be ascertained whether the firing piston 11 has moved forwards or has recoiled slightly. From the impulse sequence in FIG. 8, left-hand side, it can be seen, for example, that the firing piston 11 has moved forwards, whereas the marking shown at the right-hand side reveals that the piston has reversed its direction of movement, for example has recoiled as a result of the impact.

We claim:

1. A cold chamber die-casting machine having a firing piston, a piston rod connected thereto and a device for measuring the speed of movement of said piston, said device comprising: a reflector mounted on said piston rod; a first member disposed generally parallel to said piston rod and carrying a plurality of regularly spaced light transmitters; a second member disposed generally parallel to said piston rod and carrying a plurality of regularly spaced light receivers, said members being so arranged that light from any one of said transmitters is reflected by said reflector to a corresponding one of said light receivers when said reflector is adjacent said one transmitter.

2. A die-casting machine according to claim 1, wherein said members are in the form of flat strips arranged at equal angles of inclination to a normal through said transmitter.

3. A die-casting machine according to claim 1, wherein said light emitters are constituted by respective one ends of transparent light conducting filaments, the other ends of which are directed towards a common light source.

4. A die-casting machine according to claim 3 wherein a convex lens is disposed between said other ends of the filaments and said light source.

5. A machine according to claim 1 wherein said light receivers are in the form of respective one ends of a plurality of light conducting transparent filaments, the other ends of which one directed towards a photoelectric receiver.

6. A machine according to claim 5 wherein said photoelectric receiver comprises a single photodiode.

7. A machine according to claim 5 wherein said photoelectric receiver comprises a set of photodiodes, the receiving light conductors being arranged in a plurality of groups, conductors from each group leading to one of the sets of photodiodes, and each photodiode being connected to a recorder which records impulses from each photodiode distinctly from impulses from the other photodiodes.

8. A machine according to claim 1 further comprising a recorder having a paper tape upon which marks are made in response to impulses passed thereto as said piston rod moves and so moves the reflector to transmit light from said light emitters to said light receivers.

9. A machine according to claim 7 wherein a common convex lens is arranged between each group of receiving filaments and the respective photodiode.

10. A machine according to claim 1, wherein said piston rod is connected to a press piston rod of the machine by a screw cap connection and said reflector is constituted by a facetted highly polished ring of greater diameter than and secured to said screw cap.

* * * * *